July 31, 1934.  H. W. BODENDIECK  1,968,736
GROUNDING SET
Filed Oct. 12, 1928   3 Sheets-Sheet 1
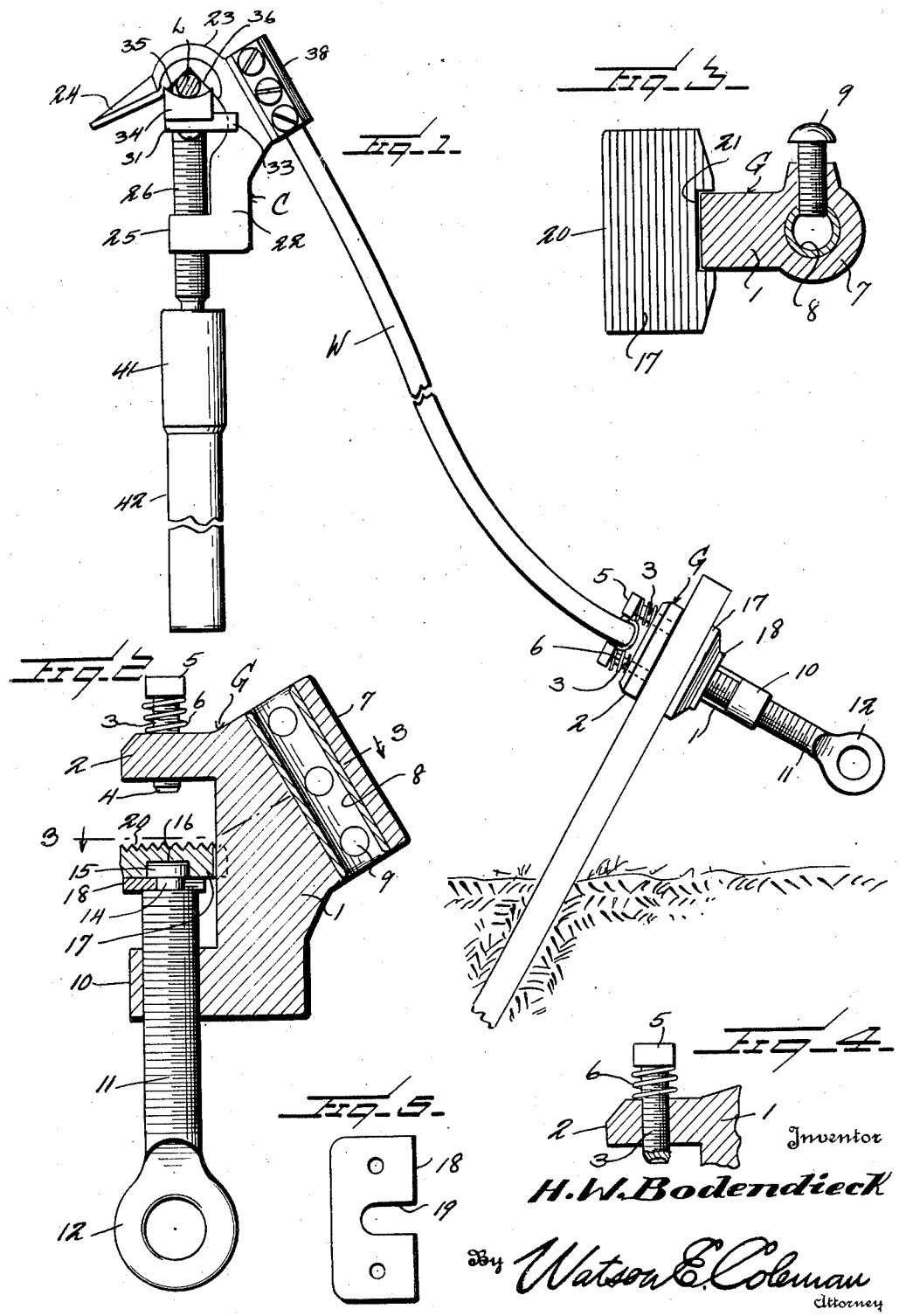
Inventor
H. W. Bodendieck
By Watson E. Coleman
Attorney July 31, 1934.  H. W. BODENDIECK  1,968,736
GROUNDING SET
Filed Oct. 12, 1928  3 Sheets-Sheet 2
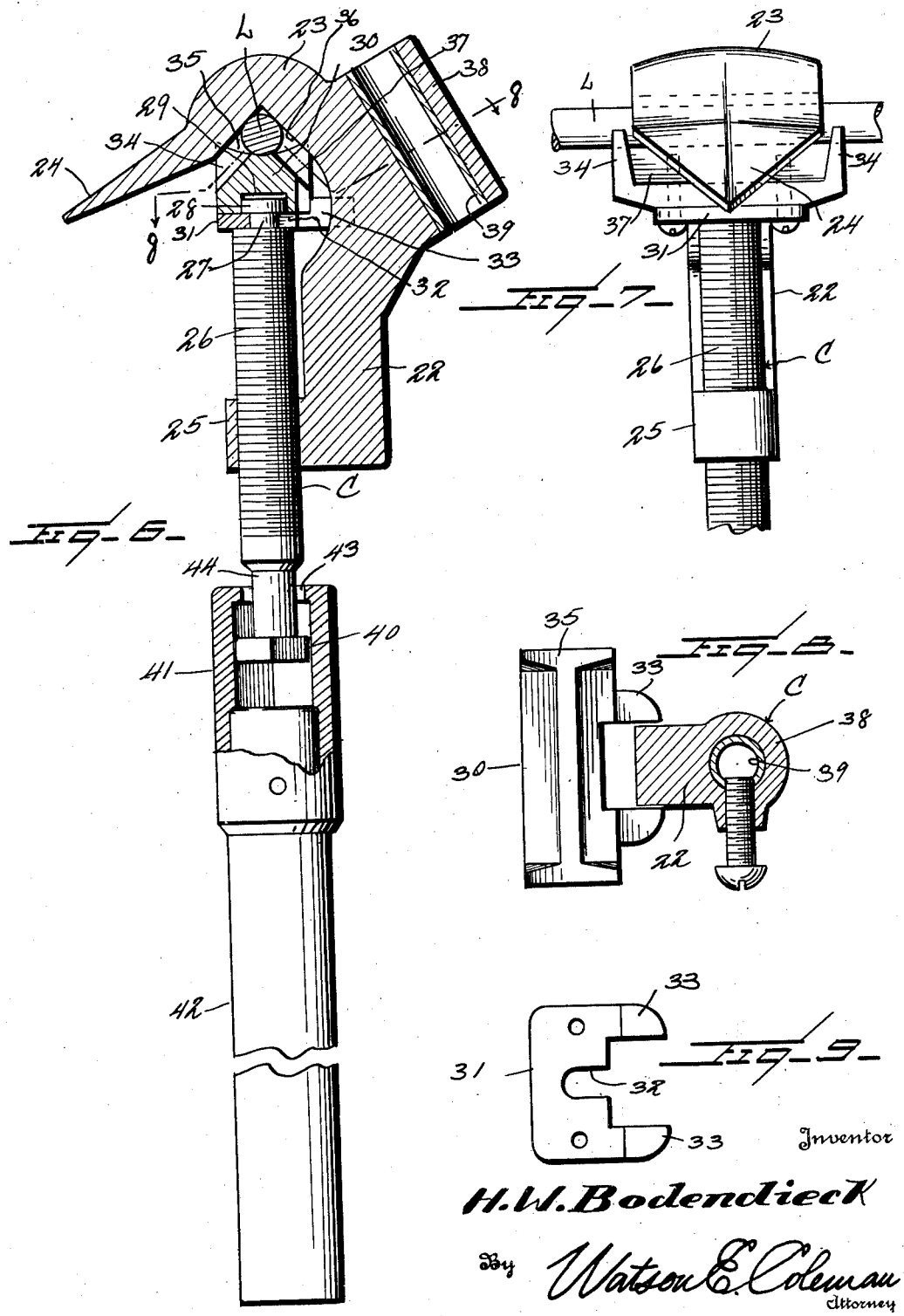
Inventor
H. W. Bodendieck
By Watson E. Coleman
Attorney July 31, 1934.                H. W. BODENDIECK                1,968,736
                                GROUNDING SET
                            Filed Oct. 12, 1928              3 Sheets-Sheet 3
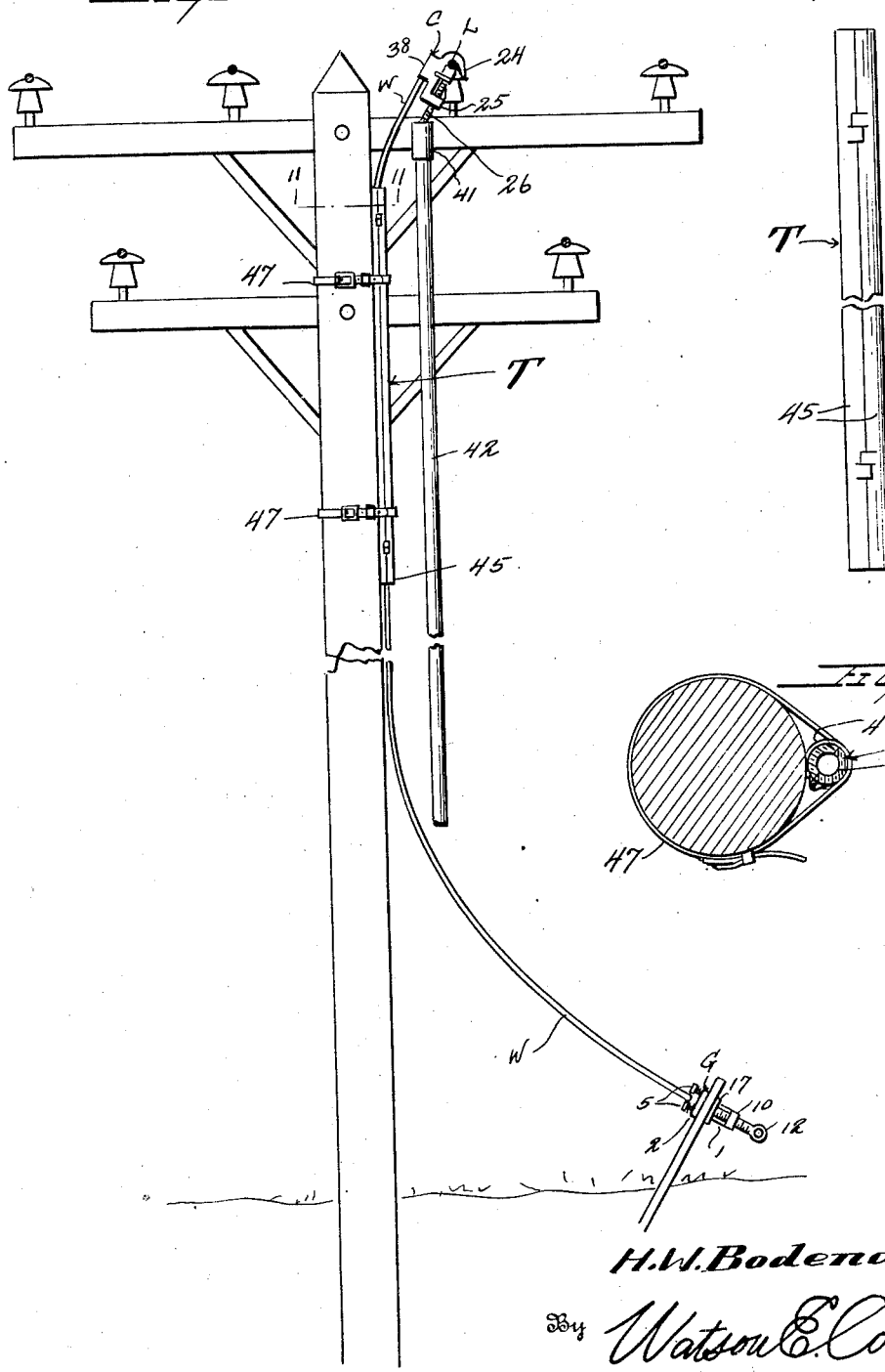

Patented July 31, 1934

1,968,736

UNITED STATES PATENT OFFICE 1,968,736

GROUNDING SET

Henry W. Bodendieck, Taylorville, Ill., assignor to Tip's Tool Company, Inc., Taylorville, Ill., a corporation of Illinois Application October 12, 1928, Serial No. 312,108

6 Claims. (Cl. 173—273)

This invention relates to a grounding set and has relation more particularly to a set of this kind especially designed and adapted for use in connection with hot or high tensioned lines, and it is an object of the invention to provide an equipment to assure proper grounding of transmission lines and substations before attempting any work when the lines are supposedly dead.

It is also an object of the invention to provide a set or equipment of this kind including a clamp which can be quickly engaged with a transmission line and wherein said clamp has associated therewith an operating pole, the connection between said pole and clamp constituting what may be termed a "universal connection".

The invention, furthermore, has for an object to provide a transmission line clamp comprising two relatively movable jaws and wherein said movable jaws are provided with means for holding the same against lateral movement.

An additional object of the invention is to provide a set or equipment of this kind including a transmission line clamp and a ground clamp and wherein each of said clamps includes a bore through which is inserted an end portion of a jumper or ground wire and wherein said bore is provided with a cast-in lining of a character eliminating possibility of electrolysis and high resistance joints between the jumper or ground wire and the clamp and more especially when the transmission line is of aluminum and the jumper or ground wire of copper.

The invention also has for an object to provide a set or equipment of this kind wherein the ground clamp is of a character to assure a perfect connection to a tower leg or other ground and more especially when said tower leg or the like is covered with rust or paint.

The invention consists in the details of construction and in the combination and arrangement of the several parts of my improved grounding set whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation illustrating a ground set or equipment constructed in accordance with an embodiment of my invention;

Figure 2 is a view partly in section and partly in elevation illustrating the ground clamp as herein employed;

Figure 3 is a sectional view taken substantially on the line 3—3 of Figure 2;

Figure 4 is a fragmentary view partly in section and partly in elevation illustrating in detail one of the contact screws forming part of a ground clamp jaw;

Figure 5 is a view in plan of the removable plate for maintaining the operating screw for the movable jaw in swivelled connection with said jaw;

Figure 6 is a view partly in elevation and partly in section of the wire clamp as herein comprised;

Figure 7 is a view in front elevation of the upper portion of the structure as illustrated in Figure 6;

Figure 8 is a sectional view taken substantially on the line 8—8 of Figure 6;

Figure 9 is a view in plan of the plate as herein embodied for maintaining the movable jaw in swiveled connection with the operating screw therefor;

Figure 10 is an elevational view illustrating a guide member employed in connection with my improved grounding set;

Figure 11 is a sectional view taken substantially on the line 11—11 of Figure 10;

Figure 12 is an elevational view of the guide member unapplied.

As particularly illustrated in Figure 1, my improved grounding set or equipment comprises a live transmission wire clamp C and a ground clamp G operatively connected by the jumper or ground line W of desired length, said jumper or ground line is preferably of copper protected with rubber sheeting so that said line W will possess a high degree of flexibility to facilitate the use of the set or equipment under various conditions.

The ground clamp G comprises a body member 1 of requisite dimensions and which is provided adjacent to one end with a fixed jaw 2 relatively broad and through which are threaded the spaced contact screws 3. The inner end portion of each of these screws 3 is cupped, as at 4, so that when the clamp G is engaged with the desired ground each of the screws 3 may be operated to assure effective contact therewith, and more especially when such ground may be covered with rust or paint such as is often the case in connection with a tower leg.

Surrounding each of the screws 3 and interposed between the outer face of the fixed jaw 2 and the head 5 of the screw is a coil spring 6 encircling such screw and which serves as an effective means to hold the screw against turning after being properly adjusted with respect to the work with which the ground clamp may be engaged, yet at the same time permitting the requisite endwise movement of such screw to effect the desired contact.

The body 1 at the end portion thereof adjacent to the jaw 2 and at the side remote therefrom has integrally formed therewith a sleeve or barrel 7, the bore of which being open at opposite ends, said bore also being in divergence with respect to the end portion of the body 1 provided with the jaw 2. The bore of the sleeve or barrel 7 has cast therein a lining 8 of suitable material, such as copper. This is an important feature of the device and especially the fact that the lining 8 is cast within the barrel or sleeve 7. The provision of this lining 8 is of importance and advantage as it is the general practice to make the sleeve or barrel 7 of aluminum or kindred metal, the jumper or ground line W is generally made of copper.

It is now the general practice to produce high tensioned or hot lines from aluminum while the ground or jumper wires are of copper. By providing the cast-in lining 8 air is excluded from interference with the connection between an extremity of a jumper or ground wire and the lining 8, thus eliminating the possibility of electrolysis and high resistance joints between the copper and aluminum conductors.

An extremity or end portion of the wire or line W is inserted within the bore of the sleeve or barrel 7 through either end thereof as the requirements of practice may prefer, said line or wire being effectively held against displacement by the binding screw 9 threaded through a wall of the sleeve or barrel 7 and the adjacent portion of the lining 8.

The body 1 at a point spaced from the jaw 2 is provided with an outwardly disposed lug or block 10 extending in the same general direction as the jaw 2 and through this block is threaded an elongated screw 11 provided, as herein disclosed, at its outer extremity with an eye member 12 to facilitate the requisite turning movement of the screw 11. The opposite end portion of the screw 11, or that extremity normally between the jaw 2 and block 10, is provided with a reduced extension 14 terminating in an enlargement or head 15. This head or enlargement 15 is freely received within a pocket or recess 16 provided in the under surface of a movable jaw 17. A plate 18 is disposed over the rear or outer surface of the jaw 17 and adapted to be held thereto by screws or the like. This plate 18 in a marginal portion thereof is provided with a relatively narrow open ended slot 19 in which is received the reduced extension 14. This slot 19 is of a width less than the diameter of the head 15 whereby effective means is provided for swivelly connecting the screw 11 with the movable jaw 17 and in a manner whereby such connection may be disengaged when required, as for the replacement of the screw 11 or of the jaw 17.

The outer face of the jaw 17 is provided lengthwise thereof with the ribs 20, each preferably in cross section being in the form of an inverted V. These ribs 20 provide means to assure the effective engagement of the movable jaw 17 with the ground and more especially in the event that such ground should be covered with rust or paint.

In practice it is of importance that the applied movable jaw 17 be non-rotatable with respect to the body member 1 and for this purpose the inner marginal portion of the applied jaw 17 is provided with a recess 21 and which substantially snugly receives the adjacent portion of the body member 1 between the jaw 2 and the block or lug 10. It is also to be understood that the swiveled connection provided between the screw 11 and the movable jaw 17 is such as to permit the movable jaw 17 to have slight swinging movement either in a lengthwise or lateral direction, thus assuring said jaw 17 automatically aligning with the ground member with which the clamp G may be engaged.

The line clamp, as herein set forth, comprises a body member 22 provided at one end portion with an outwardly disposed stationary clamping jaw 23, the outer or free end of which being continued by an elongated tongue or extension 24 to facilitate the engagement of the clamp with the line. The body member 22 at a point suitably spaced from the jaw 23 is provided with a lug or block 25 extending in the same general direction as the jaw 23 and through which is threaded the elongated shank or bolt 26.

The inner portion of the bolt or shank 26, or that portion normally arranged between the jaw 23 and the lug or block 25, is provided with a reduced extension 27 terminating in an enlargement or head 28. This enlargement or head 28 is freely received within a pocket or recess 29 provided in the outer face of a movable jaw 30. Disposed over the under surface of this movable jaw 30 and held thereto by screws or the like is a plate 31.

This plate 31 is provided with an open slot 32 in which is received the reduced extension 27. This slot 32 is of a width less than the diameter of the enlargement or head 28 whereby the plate 31 serves to substantially connect the movable jaw 30 with the screw 26. It is important that the movable jaw 30 be substantially non-rotatable with respect to the screw or shank 26 and, therefore, the plate 31 is provided with the spaced projections or fingers 33 which have substantial close contact with the side faces of the body member 22 as is particularly illustrated in Figure 8 of the drawings.

The jaw 30 is of a length to extend a slight distance beyond opposite ends of the jaw 23 and the end portions of the jaw 30 are provided with upstanding flanges 34, the upper edge or margin of each of which being suitably curved, as at 35, on a desired inbow. These edges or margins 35 provide guides to assist in lining up a conductor or hot line L with respect to the stationary jaw 23, or more particularly the receiving groove 36 provided in the under or working face of said jaw 23. This receiving groove 36 is, in cross section, substantially in the form of an inverted V.

It is to be noted that the upper portion of the jaw 30 at the front and rear are inwardly beveled, as at 37, to conform to the angularity of the walls of the receiving groove 36 so that in practice the jaw 30 may readily enter such receiving groove 36 and thus materially widen the field of use of the clamp C. The clamp C, as herein disclosed, is of a type to permit the same to be readily employed in connection with an eight gauge wire to a one and three-quarter inch bus bar.

The rear portion of the body member 22 at the end thereof adjacent to the jaw 23 is provided with the barrel or sleeve 38, the bore of which being disposed in convergence with respect to the jaw 23 and which is also provided with a cast-in lining 39 of suitable material. This lining 39 is for the same purpose as hereinbefore set forth with respect to the lining 8 for the bore of the sleeve or barrel 7 comprised in the ground clamp G. The barrel or sleeve 38 is generally made of aluminum as is also the line L.

The outer end portion of the shank or bolt 26, or that end portion disposed beyond the block or lug 25, is provided with a hexagon head 40 which is engaged within a socket member 41 mounted upon and secured to an end portion of an elongated operating handle 42. The outer end of the socket member 41 is provided with a restricted opening 43 through which the screw 26 may readily pass, but it is to be noted that the outer end of the screw 26 and the hexagon head or nut 40 are connected by a reduced neck 44 so that when the operating handle 42 is at the limit of its movement in a direction away from the screw 26 a connection will be provided enabling the workman to operate the shank or screw 26 as desired with the operating handle 42 at varying angles with respect to the screw 26 as may be occasioned by the requirements of practice.

The portion of the peripheral wall of the socket member 41 with which the head 40 is movable is of cross sectional configuration to conform to the head 40 so that at all times the socket member 41 will be engaged with the shank or screw 26 to effect the desired rotation of said shank or screw.

As before stated, when the head 40 is adjacent to the outer end of the socket member 41 relative lateral adjustment of the screw 26 and operating handle 42 is provided but it is to be noted that with the shank or bolt 26 extended downwardly within a socket member 41 the connection between the socket member 41 and the shank or screw 26 is substantially rigid. This is particularly desirable in first applying the clamp to the hot transmission line.

As is well known the hot or transmission lines are disposed at the upper portion of a pole or tower structure and with lines of lesser voltage strung therebelow. In grounding a hot or transmission line under certain conditions and particularly when the lines therebelow of lesser voltage may hinder or obstruct the jumper or ground line W, it is of importance to provide means for guiding said line W to eliminate its contact with any of the lower lines. For this reason the elongated tubular guide member T may be employed. This member T is preferably of wood although it can be made of other insulating material and comprises two hingedly connected sections 45 to facilitate the application or removal of the line W with respect to the member T. The sections 45 of this member T may be maintained closed in any desired manner but preferably through the instrumentality of the encircling straps 46 which are provided with the extended strap portions 47 adapted to encircle a tower leg, pole or other support to maintain the member T in desired position.

From the foregoing description it is thought to be obvious that a grounding set constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An operating means for the movable jaw of an electric line clamp having a shank in threaded engagement with the clamp operatively engaged with the jaw, the outer portion of the shank being provided with a reduced neck, and a head on the shank outwardly of the neck; including an insulating operating handle, a socket member carried thereby, the outer end portion of the socket member being provided with an opening through which the shank passes, the head being of a diameter larger than said opening, the periphery of the head and the wall of the socket member having coacting means to hold the socket member and shank against rotation one independently of the other, said neck when disposed through the opening in the socket member permitting said socket member and shank to have relative lateral movement.

2. The combination with an operating screw for a movable jaw of an electric line clamp, the outer portion of the screw being provided with a reduced neck and a head of an insulating operating handle for the screw, a socket member carried thereby, the outer end portion of the socket member being provided with an opening through which the screw enters the socket member, the head of the screw being within the socket member and of a diameter larger than the opening, the periphery of the head and the wall of the socket member having coacting means to hold the socket member and screw against rotation one independently of the other, said neck when disposed through the opening of the socket member providing means to permit said socket member and screw to have relative lateral swinging movement, said screw being received within the socket member when the operating handle and screw are substantially aligned and the operating handle moved lengthwise of the screw.

3. The combination with an operating screw for a movable jaw of an electric line clamp, the outer portion of the screw being provided with a reduced neck and a head of an insulating operating handle for the screw, a socket member carried thereby, the outer end portion of the socket member being provided with an opening through which the screw enters the socket member, the head of the screw being within the socket member and of a diameter larger than the opening, the periphery of the head and the wall of the socket member having coacting means to hold the socket member and screw against rotation one independently of the other, said neck when disposed through the opening of the socket member permitting said socket member and screw to have relative lateral movement, said screw being received within the socket member when the operating handle and screw are substantially aligned and the operating handle moved lengthwise of the screw, said screw when received within the socket member coacting with the socket member to hold the operating handle and the screw against relative lateral swinging movement.

4. The combination with a threaded operating member for a movable jaw of an electric line clamp, said member being provided with a reduced neck and a head of an insulating operating handle, a socket member carried by the handle, the outer end portion of the socket member being provided with an opening through which the reduced neck of the first named member enters the socket member, the head of the first named member being within the socket member and of a diameter larger than the opening, the periphery of the head and the wall of the socket member having coacting means to hold the socket member and the first named member against rotation one independently of the other, said neck, when the head of the first named member is positioned adjacent the outer end of the socket member, providing means to permit said socket member and the first named member to have relative lateral swinging movement, the reduced neck of said first named member being further received within the socket member when the operating handle and first named member are substantially aligned and the operating handle moved lengthwise and inwardly of the first named member to make effective the coacting means for holding the socket member and the first named member against rotation one independently of the other.

5. An operating means for the movable jaw of an electric line clamp having a shank carried by the clamp operatively engaged with the jaw, the outer portion of the shank having a head; including an insulating operating handle, a socket member carried thereby, the outer end portion of which has an opening through which the shank passes, said socket member having means for coaction with the head to prevent the head passing out through said opening, said socket member and head having coacting means to hold the socket member and head against rotation one independently of the other, the operating member having lateral swinging movement with respect to the head.

6. An operating means for the movable jaw of an electric line clamp having a shank in threaded engagement with the clamp operatively engaged with the jaw, and a head on the shank; including an insulating operating handle, a socket member carried by the handle, the outer end portion of the socket member being provided with an opening through which the shank passes, the head being of a diameter larger than said opening, the periphery of the head and the wall of the socket member having coacting means to hold the socket member and shank against rotation one independently of the other, the diameter of the shank adjacent to the head permitting, when said portion of the shank is disposed through the opening in the socket member, said socket member and shank to have relative lateral movement.

HENRY W. BODENDIECK.